United States Patent [19]

Altmann

[11] Patent Number: 4,517,677
[45] Date of Patent: May 14, 1985

[54] STABLE OPTICAL LASER RESONATOR

[75] Inventor: Konrad Altmann, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 387,189

[22] Filed: Jun. 10, 1982

[30] Foreign Application Priority Data

Jun. 29, 1981 [DE] Fed. Rep. of Germany ....... 3125544
Aug. 21, 1981 [DE] Fed. Rep. of Germany ....... 3133142

[51] Int. Cl.³ .............................................. H01S 3/05
[52] U.S. Cl. .................................... 372/99; 372/66; 372/103; 372/108
[58] Field of Search ............ 372/99, 18, 24, 30, 372/103, 108, 92, 66, 25; 350/288, 293

[56] References Cited

U.S. PATENT DOCUMENTS 3,628,180 12/1971 Segre ................................. 331/94.5
4,287,482 9/1981 Wert ..................................... 372/99

FOREIGN PATENT DOCUMENTS 2449123 4/1976 Fed. Rep. of Germany ........ 372/99

OTHER PUBLICATIONS

"Laser" by D. Roess, published by Akademische Verlagsanstalt, in Frankfurt/Main, 1966, pp. 336 to 339.
"Naturwissenschaften", Nr. 14, p. 664, 1926, by E. Schroendinger.
IEEE Journal of Quantum Electronics QE-5, (1969), Nr. 12, pp. 569 to 575.
"Quantum Mechanics", written by L. I. Schiff, published by McGraw-Hill, New York, 1949.
IEEE Journal of Quantum Electronics, Jul. 1968, pp. 471–473, by D. H. Auston.

Primary Examiner—James W. Davie
Attorney, Agent, or Firm—W. G. Fasse; D. H. Kane, Jr.

[57] ABSTRACT

A stable optical laser resonator is formed by two mirrors facing each other. At least one of the mirrors operates as a decoupling device for decoupling a coherent, pulsating laser beam from the resonator. For this purpose the decoupling mirror has a zone or zones which are permeable or partially permeable to the laser beam. These zones are located in predetermined areas of the mirror and the size of these zones is relatively small compared to the total effective mirror surface. Preferably, the active lasing medium is limited to a narrow cross-sectional area perpendicularly to the optical axis of the resonator. The narrow cross-sectional area has an approximately rectangular shape for enforcing the one-dimensional oscillation movement of a laser beam.

16 Claims, 9 Drawing Figures

STABLE OPTICAL LASER RESONATOR

CLAIM TO PRIORITY

The present application is based on German Ser. No. P 3,125,544.2, filed in the Federal Republic of Germany on June 29, 1981 and on German Ser. No. P 3,133,142.4, filed in the Federal Republic of Germany on Aug. 21, 1981. The priorities of both German filing dates are claimed for the present application.

BACKGROUND OF THE INVENTION

The invention relates to stable optical laser resonators. Such resonators include mirrors arranged opposite each other enclosing a space filled with a lasing medium. At least one of these mirrors is permeable or partially permeable for decoupling the laser beam.

According to prior art methods pulsed or pulsing laser radiation is produced by means of so-called Q-switch lasers. Such pulsing laser radiation comprises a series or train of uniform short duration impulses of high power. Heretofore, it has been necessary to make the resonator temporarily permeable for the decoupling of the pulsating laser beam. Special optical switches and involved or expensive electronic circuits for the control of these optical switches have been required prior to the present invention.

It is known from experiments described in a book entitled "Laser" by D. Roess, published by "Akademische Verlagsanstalt" in Frankfurt/Main, 1966 pages 336 to 339, that a spontaneous coupling of the transversal modes does occur in optical laser resonators. However, so far it has not been possible to theoretically explain this fact within the framework of the prior art laser theory describing the optical resonator. Such prior art laser theory is based on the diffraction theory: developed by Huygens and Fresnel. Thus, no further attention has been paid to this optical characteristic or feature of an optical laser and the feature has not been used in any practical or technological sense.

It is also known that E. Schroedinger has published a theory which reconciles the teachings of classic mechanics with the teachings of quantum mechanics. Reference is made to "Naturwissenschaften" Nr. 14, 1926, page 664, 1926. Further reference is made in this context to the book "Quantum Mechanics" written by L. I. Schiff, published by McGraw-Hill, New York, 1949. The invention makes use of the theory developed by Schroedinger and Schiff.

OBJECTS OF THE INVENTION

In view of the above it is the aim of the invention to achieve the following objects singly or in combination:

to simplify the generation or production of pulsating laser radiation;

to improve the coherence of the laser beam decoupled from a pulsating laser;

to practically utilize the above mentioned spontaneous coupling of the transversal modes in an optical laser resonator; and to enforce the one-dimensional oscillation movement of the laser beam by a respective three-dimensional distribution of the lasing medium.

SUMMARY OF THE INVENTION

According to the invention a stable optical laser resonator comprises two mirrors arranged opposite each other to define a space for a lasing medium between the mirrors. At least one of these mirrors is permeable or at least partially permeable to the laser beam for decoupling the laser beam. The permeable or partially permeable mirror is so constructed that its permeable or partially permeable area is located at defined positions and this permeable area has a small size relative to the effective size or surface area of the decoupling mirror. The total permeable or partially permeable mirror surface area should be within the range of one % to twenty % of the total effective mirror surface area of the decoupling mirror.

In a special embodiment of the invention the dimension of the lasing medium in the direction perpendicularly to the optical axis, is limited to a narrow approximately rectangular surface area.

It has been found that by utilizing the above mentioned spontaneous coupling of the transversal modes it is possible to achieve the desired decoupling with rather simple structural features of the resonator, as may be seen in more detail in the accompanying drawings. Another advantage of the invention is seen in that the decoupled laser radiation impulses have a high degree of coherence.

The invention is based on the following new theory of an optical resonator. It is possible to calculate a force field on the basis of the force which is caused by the mirrors of an optical resonator. This force opposes the radiation pressure of the light and is effective on the photons which are reflected back and forth between the mirrors of an optical resonator. This force field is effective in a direction perpendicularly to the optical axis of the resonator. If we take into account, that the photons have, according to Einstein, a relativistic mass $M = h/c\lambda$, we can postulate with the aid of the potential caused by said force field a Schroedinger - Equation which defines or describes the movement of the photons transversely to the optical axis of the optical resonator. Incidentally, in the equation $M = h/c\lambda$, M is the relativistic mass of the photons h is the Planck's constant or quantum, c is the speed of light and $\lambda$ is the wavelength of the light.

The above mentioned Schroedinger - Equation for optical resonators having spherical mirrors is identical to the equation for the two-dimensional harmonic oscillator. It can be shown that the eigenfunctions of that equation are identical to the expressions for the field distribution of the transversal modes, whereby these expressions are obtained with the aid of the diffraction theory. The same applies to the frequency spacings, which may be calculated from the energy eigenvalues. This also applies to the spot or dot size of the basic mode. Thus, it may be said that the outlined theory provides a definition or description of the optical resonator which is equivalent to the diffraction theory.

Additionally, however, the present theory makes it possible, contrary to the diffraction theory, to make statements regarding the location and time dependency of the intensity distribution in an optical laser having a larger number of excited modes.

Due to the small diffraction losses in optical resonators having large Fresnel numbers, it is possible to describe the characteristics of such resonators approximately with the aid of geometric optics. A theory for describing the intensity distribution in an optical laser must also be valid under the considerations applicable in the borderline case of geometric optics. Therefore, it is necessary that such a theory combines the postulations of geometric optics with those of wave theory optics. This means with regard to a particle image that a theory must be found or developed which combines the results of classic mechanics with those of quantum mechanics. Such a theory was published by E. Schroedinger in 1926, please see the above mentioned Schroedinger publication.

Schroedinger provided the time dependent eigenfunctions of the harmonic oscillator with coefficients which have absolute value squares corresponding to a Poisson distribution. By summing these absolute value squares Schroedinger obtained a time dependent wave function having a probability distribution which describes the motion of a mass point or dot of a classical harmonic oscillator, please also see the above mentioned publication by Schiff. If we perform the same calculation for the transversal modes of an optical resonator, we obtain a beam oscillating perpendicularly to the optical axis and having an intensity distribution profile which is identical at all times to a Gaussian distribution. The size of the dot of this beam is identical to the size of the basic mode. The frequency $\tilde{\gamma}$ of this oscillation corresponds to the frequency spacing of the transversal modes. The intensity distribution, which is obtained by an averaging operation as a function of the motion of the beam, corresponds very well to the measured results. Thus, it follows that the respective definition or description of the characteristic of an optical resonator is correct.

It follows further, that in an optical resonator there must exist a spontaneous coupling of the transversal modes, whereby this coupling may be recognized in the form of an oscillating Gaussian beam. According to the invention this oscillating Gaussian beam may be used for producing or generating a pulsating laser radiation. This may be accomplished by constructing the decoupling mirror in such a manner that it is only permeable or partially permeable at predetermined locations within a zone which is small relative to the effective mirror surface as mentioned above.

According to a further embodiment of the invention the active lasing medium in a direction substantially perpendicularly to the optical axis is limited to a narrow surface having an approximately rectangular configuration. This feature avoids the increase in the dot size of the oscillating beam which may otherwise result due to the small transversal dimension of the mirror. This feature of the invention further reduces the diffraction losses.

BRIEF FIGURE DESCRIPTION

In order that the invention may be clearly understood, it will now be described, by way of example, with reference to the accompanying drawings, wherein:

FIG. 1a is a view of FIG. 1 in the direction of the arrow 1a in FIG. 1;

DETAILED DESCRIPTION OF PREFERRED EXAMPLE EMBODIMENTS AND OF THE BEST MODE OF THE INVENTION

Figure 1:
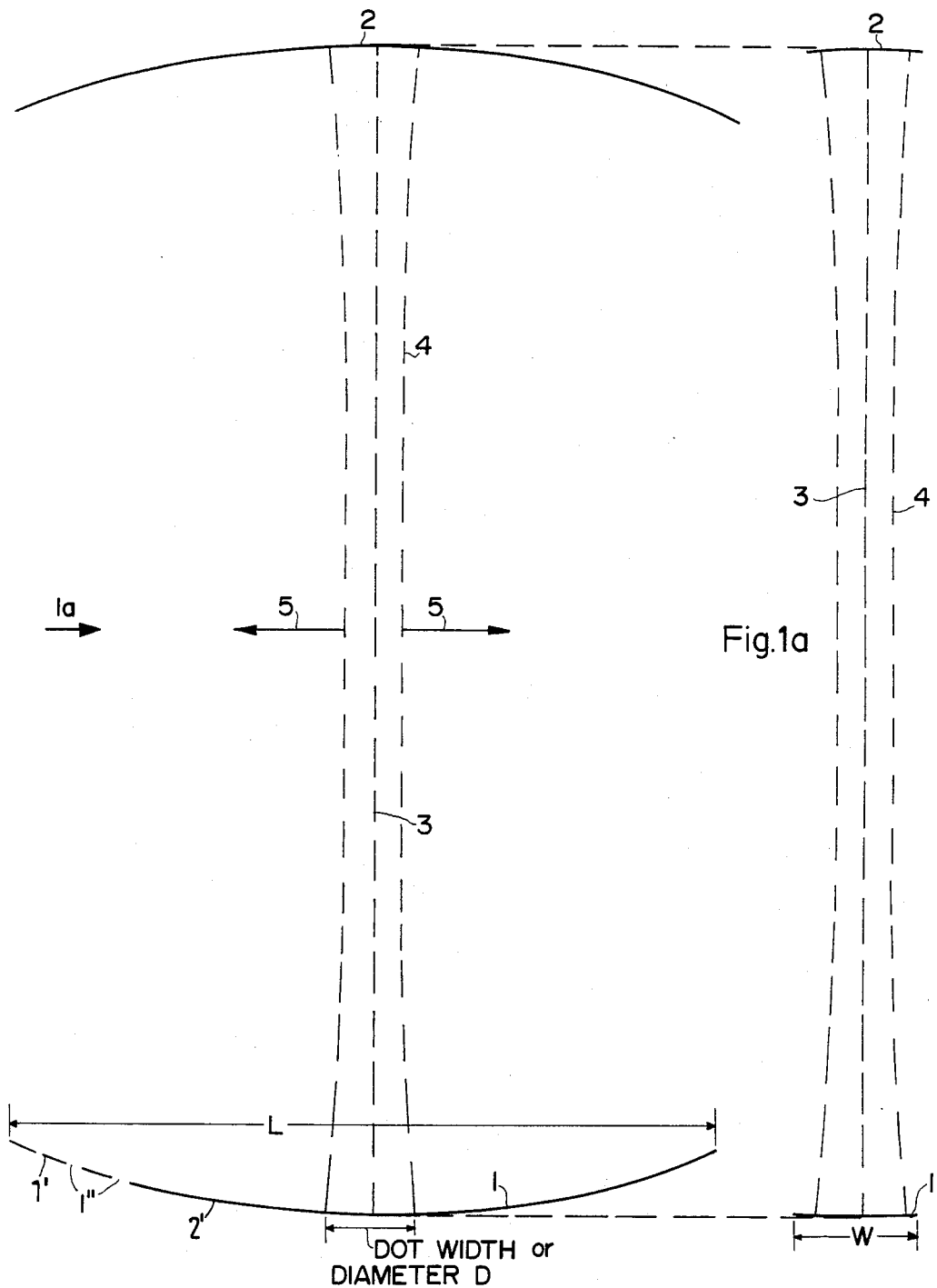
FIG. 1 is a schematic sectional view of a stable optical resonator having two strip mirrors arranged opposite each other and on both sides of a lasing medium.

FIG. 1 illustrates the simplest mode of realizing an optical resonator according to the invention by constructing the resonator to include two spherical strip mirrors 1 and 2 arranged opposite each other as shown in FIGS. 1 and 1a. The space between the mirrors 1 and 2 confines the lasing medium. The optical axis 3 of the space between the mirrors 1 and 2 extends in the plane of the drawing. The mirror 1 has a main zone 2' without any permeability and marginal strips 1' with holes 1" for the decoupling of a laser beam through these holes 1".

The width W of a strip mirror shown in FIG. 1a is selected to fall into the same order of magnitude as the dot size D of the transversal basic mode. The length L of these mirrors 1 and 2 is shown in FIG. 1 and is selected to be suitably adapted in any desired manner to the features of any given system. Thus, it is achieved that the Gaussian beam 4 oscillates in a direction perpendicularly to the optical axis 3 in the longitudinal direction 5 of the mirrors 1 and 2. The oscillation takes place in this longitudinal direction as indicated by the arrows 5.

If now one of the two mirrors, for example the mirror 1, is made permeable or partially permeable at any location on its surface as shown by the holes 1", it is possible to decouple through these holes 1" a uniformly pulsating laser beam. The size of the permeable or partially permeable mirror surface area corresponds suitably to the dot size D of the transversal basic mode, at least the two sizes should have the same order of magnitude.

If due to the two polarization states of the light, which states are independent of each other, two beams should occur, it is possible to eliminate or neutralize one of the beams by means of a polarizer or in any other suitable manner. Means for this purpose are known in the art.

The field strength E of the oscillating Gaussian beam may be expressed according to Schroedinger as follows, please see the above Schroedinger reference.

$$E(q, t) = \exp\left[-\frac{A^2}{4} - \tfrac{1}{2}(q - A\cos 2\pi\tilde{\gamma}t)^2\right] \cdot$$

$$\cos\left[\pi\tilde{\gamma}t + (A\sin 2\pi\tilde{\gamma}t)\left(q - \tfrac{A}{2}\cos 2\pi\tilde{\gamma}t\right)\right]$$

In this equation "q" represents the standardized deflection of the beam relative to the optical axis 3, A represents the standardized amplitude of this deflection, and t is the time.

As may be seen from this equation, the second term or expression in the argument of the cosine disappears for t=0, that is, at the return points. The cosine causes rapidly changing location depending phase variations.

Thus, the Gaussian beam has a high degree of coherence at these t=0 points. Hence, if the beam is decoupled in the permeable zone 1'', for example, of the mirror 1 in FIG. 1, one obtains an especially coherent light impulse.

The invention may also be practiced by mirror configurations other than that shown in FIG. 1. For example the resonator may be constructed by using mirrors having an astigmatic vaulting, whereby it is possible to cause the beam to trace a so-called Lissajou figure. The advantage of this type of resonator configuration is seen in that a desired length of time must pass before the beam returns to the decoupling point or location.

Figure 2:
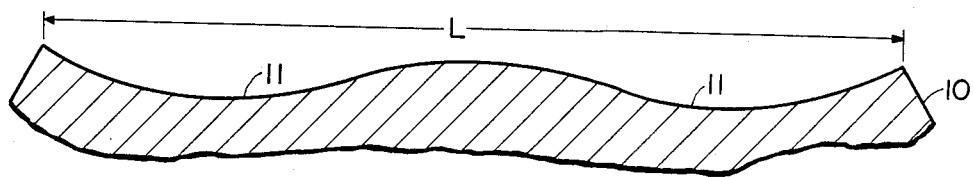
FIG. 2 is a sectional view through a mirror with double vaulting for a resonator of the invention.

FIG. 2 illustrates another possibility of constructing the present optical resonator by using strip mirrors 10 having a cross-vaulting 11 which varies in the longitudinal direction or length L of the mirror. If the mirror width in the direction perpendicularly to the plane of the drawing of FIG. 2 is selected to be larger than the spot or dot diameter of the basic mode, then it is possible to superimpose on the beam oscillation in the longitudinal direction an oscillation extending perpendicularly to the longitudinal direction. By properly cross-vaulting the decoupling mirror as shown in FIG. 2, it is possible to make sure that at the return points of longitudinal beam movement the cross-movement of the beam also comes almost to a stop. Thus, a coherent light impulse may be decoupled at these return points. For this purpose it is not necessary that the longitudinal and cross-vaultings are spherical.

Ordinary, stable optical resonators having spherical mirrors with a surface area substantially larger than the dot size of the transversal basic mode have the disadvantage that a larger number of transversal modes is triggered in these resonators. Thus, the laser radiation which has been decoupled uniformly over the entire mirror surface of these resonators is incoherent. As may be seen from the above equation this incoherence of the radiation is due to the rapid phase variation as a result of the cross-movement of the radiation. The incoherent phase variations disappear because this cross-movement stops at the edge of the mirror surface. Thus, it is possible to substantially reduce the incoherence of the radiation of such optical resonators, if the decoupling is limited to the circular edge zone or to a portion of said edge zone as taught by the invention.

Figure 3:
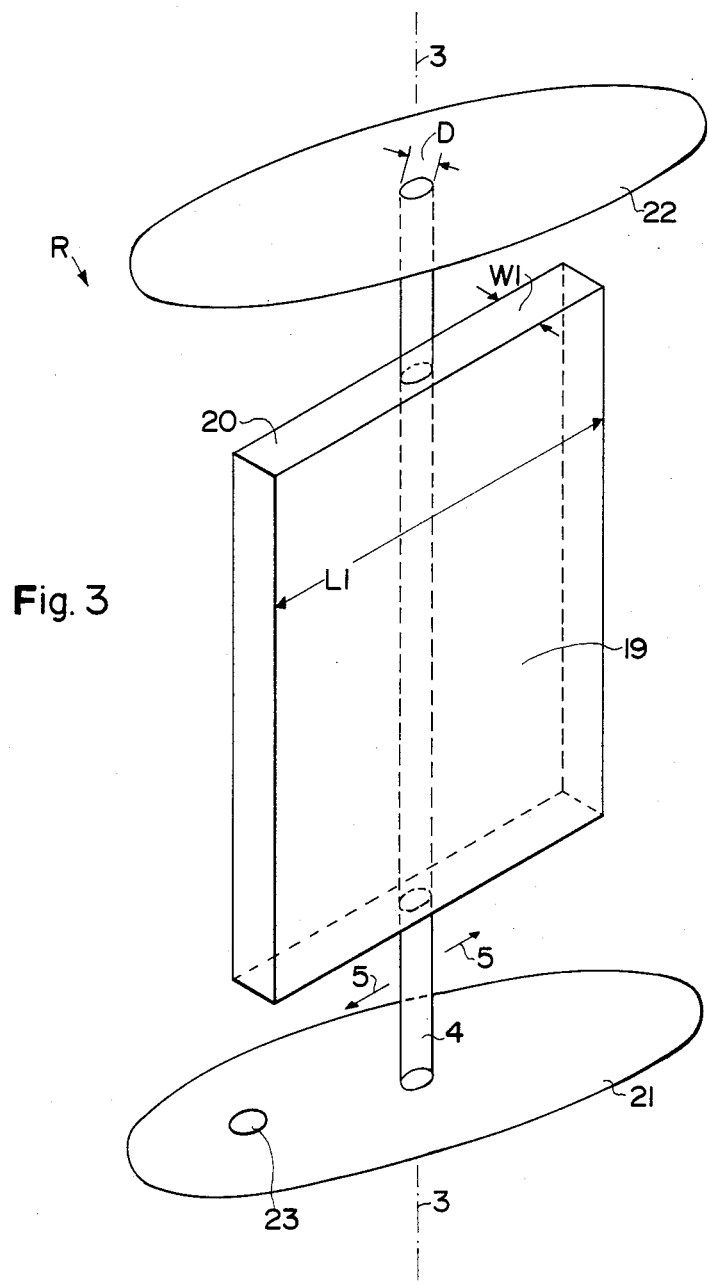
FIG. 3 shows a perspective view of a resonator for the confining of a lasing medium so that it is limited to a small surface area perpendicularly to the optical axis.
Figure 4:
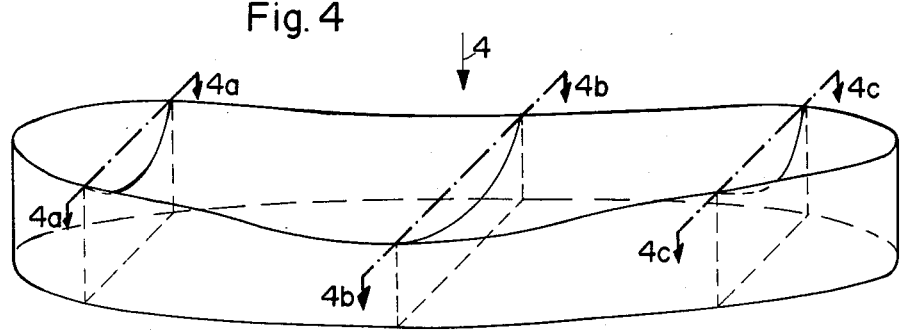
FIG. 4 is a perspective view of a reflecting resonator mirror having differing cross-vaultings in the longitudinal direction of the mirror.
Figure 4A:
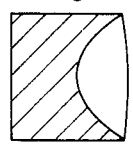
FIG. 4a is a sectional view along section plane 4a—4a in FIG. 4.
Figure 4B:
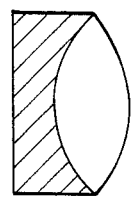
FIG. 4b is a sectional view along section plane 4b—4b in FIG. 4.
Figure 4C:
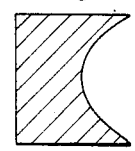
FIG. 4c is a sectional view along section plane 4c—4c in FIG. 4.
Figure 5:
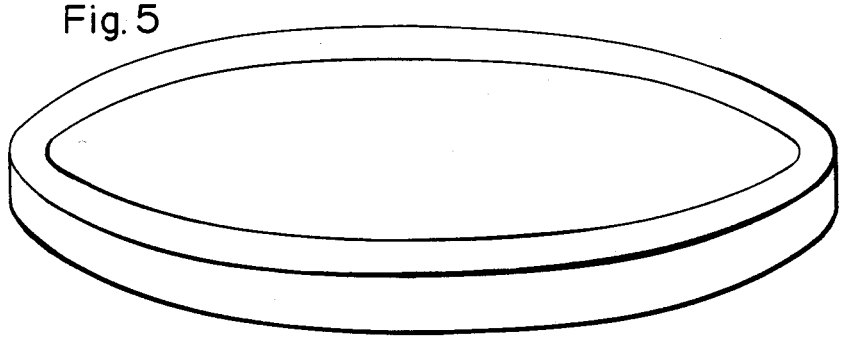
FIG. 5 is a perspective view of a circular resonator mirror with a ring shaped edge zone in which the decoupling zone or zones are located.

In the embodiment of FIG. 3 the extension of the active lasing medium is limited to a small, narrow surface 20 in the direction perpendicularly to the optical axis 3. This surface 20 is part of an optical medium 19, such as a ruby crystal and is of approximately rectangular configuration. The width W1 should be approximately twice the diameter D of the dot. The length L1 of the rectangular configuration should correspond approximately to the entire diameter of the resonator R which in turn is substantially larger than twice the dot size. The following dimensions have been found to be practical:

| dot diameter D | 4 to 8 in mm |
|---|---|
| rectangle width W1 | 4 to 8 in mm |
| rectangle length L1 | 40 to 80 in mm |
| diameter of resonator R | 50 to 120 in mm. |

This rectangle 20 should be arranged symmetrically to the optical axis 3 of the resonator mirrors 21, 22.

The just described arrangement makes sure that the oscillating beam is amplified only within the rectangle. If the beam performs oscillating movements which pass out of the rectangle 20, the beam will not be sufficiently amplified. Thus, the beam outside of the rectangle is automatically damped by the absorption losses at the resonator mirrors 21, 22.

The one-dimensional oscillation movements in the direction of the longitudinal axis of the rectangle 20 which reach closest to the edge of the mirror are amplified most due to diffraction losses. Thus, in a stationary state of the system comprising the lasing medium in the resonator, only such one-dimensional oscillation movements are possible. A decoupling hole 23 is shown in the mirror 21.

The light impulses may again be decoupled in the same manner as has been described above with reference to FIG. 1. The decoupling mirror will again be provided with a few, preferably or typically one or two zones in the area of the active lasing medium, which are permeable or partially permeable to the lasing beam. The size of these zones will again correspond to about twice the size of the dot of the transversal basic mode. The same considerations apply with regard to the coherence, if the decoupling zone is located in edge areas of the decoupling mirror, that is, the decoupling zone or zones are located at the return points of the laser beam.

Although the invention has been described with reference to specific example embodiments, it will be appreciated that it is intended to cover all modifications and equivalents within the scope of the appended claims.

I claim:

1. In a stable optical laser resonator having an optical axis and capable of having a plurality of excited transversal oscillation modes so that a spontaneous coupling of said plurality of transversal modes occurs resulting in a laser beam oscillating along a beam path transversely to said optical axis, and including two mirrors arranged to face each other to form a space for an active lasing medium, each of said mirrors having an effective mirror surface area of given size, the improvement comprising decoupling means (1'', 23) forming part of at least one of said two mirrors, said decoupling means having a decoupling area which is permeable or at least partially permeable to said laser beam, said decoupling area being small relative to said given size of said effective mirror surface area, said decoupling area being located in said beam path on or in said at least one mirror where the oscillating laser beam movement comes substantially to a stop, whereby a highly coherent light impulse is obtained.

2. The resonator of claim 1, wherein said effective mirror surface area of said decoupling mirror is within the range of 300 square mm to 3000 square mm, and wherein the size of said decoupling area is within the range of 1% to 20% of said effective mirror surface area.

3. The resonator of claim 1 or 2, wherein said permeable or partially permeable decoupling area has a size which is in the same order of magnitude s a dot size of the laser beam of the transversal basic mode of the laser resonator.

4. The resonator of claim 1 or 2, further comprising polarizing means operatively arranged in the path of a laser beam in said laser resonator.

5. The resonator of claim 1, wherein said decoupling area is located near the edges of said at least one mirror.

6. The resonator of claim 1 or 2, wherein said two mirrors are spherical strip mirrors, each mirror strip having a width corresponding to the order of magnitude of a dot size of the transversal basic mode of the laser resonator.

7. The resonator of claim 1 or 2, wherein said two mirrors have an astigmatic vaulting.

8. The resonator of claim 1 or 2, wherein said two mirrors are spherical strip mirrors having a varying cross-vaulting in the longitudinal strip direction for superimposing on the longitudinal oscillation of the laser beam in the longitudinal strip direction an oscillation in the direction extending perpendicularly to said longitudinal strip direction, said superimposed oscillation coming substantially to a stop at locations where the longitudinal oscillation returns or changes direction.

9. The resonator of claim 1 or 2, wherein said two mirrors have a double vaulting in the longitudinal direction.

10. The resonator of claim 1 or 2, wherein said two mirrors have a double vaulting in the direction perpendicularly to the longitudinal direction.

11. The resonator of claim 1 or 2, further comprising means for limiting said active lasing medium in a direction extending perpendicularly to said optical axis to a narrow cross-sectional area having an approximately rectangular shape.

12. The resonator of claim 11, wherein said rectangular shape has a width (W1) corresponding to about twice a dot size (D) of the transversal basic mode, and wherein said rectangular shape has a length (L1) which is substantially larger than said width (W1).

13. The resonator of claim 12, wherein said length corresponds to about 10 to 30 times said width of said rectangular shape.

14. The resonator of claim 12, wherein said length corresponds to about the entire diameter of said resonator.

15. The resonator of claim 11, wherein said rectangular shape is arranged symmetrically relative to said optical axis (3).

16. The resonator of claim 11, wherein said decoupling area of said mirror has a surface size in the area of said active lasing medium which is in an order of magnitude corresponding to twice a dot size of the transversal basic mode of said resonator.

* * * * *